July 25, 1967  W. VERBEEK  3,333,088
APPARATUS FOR THE THERMAL DEVELOPMENT OF
LIGHT-SENSITIVE MATERIAL
Filed July 14, 1964  2 Sheets-Sheet 1
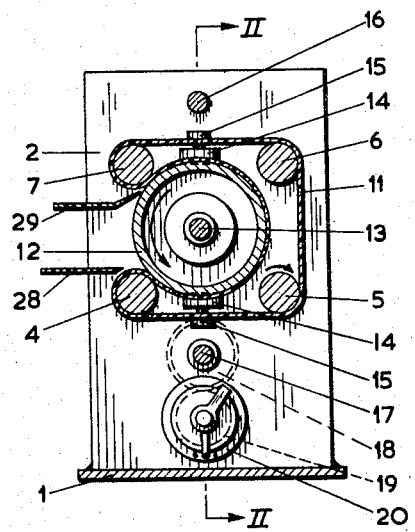
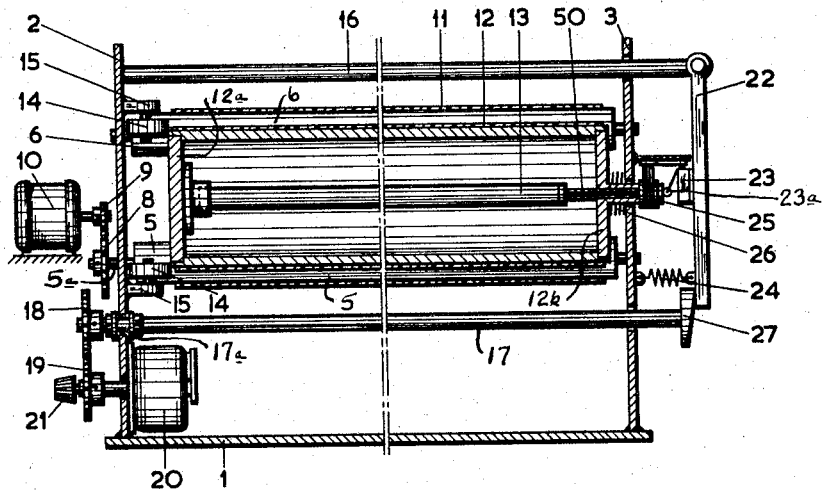
INVENTOR
WILHELM VERBEEK
BY  *Albert C. Johnston*
ATTORNEY

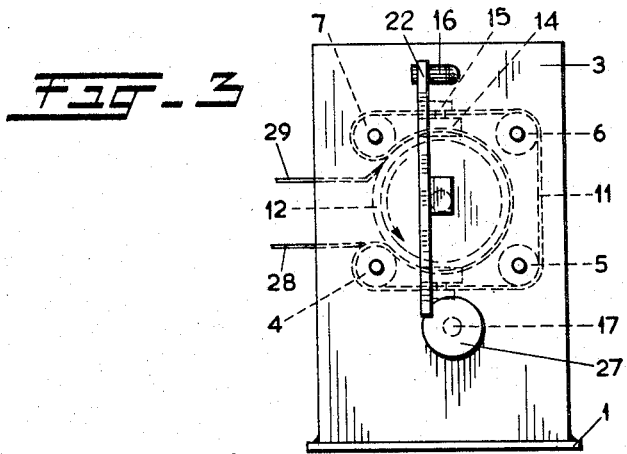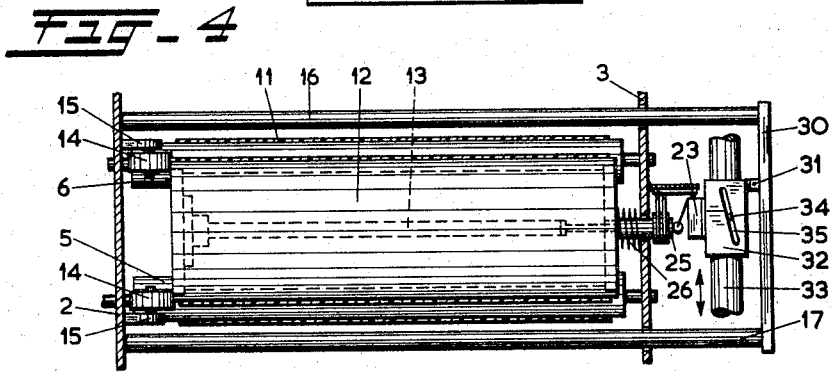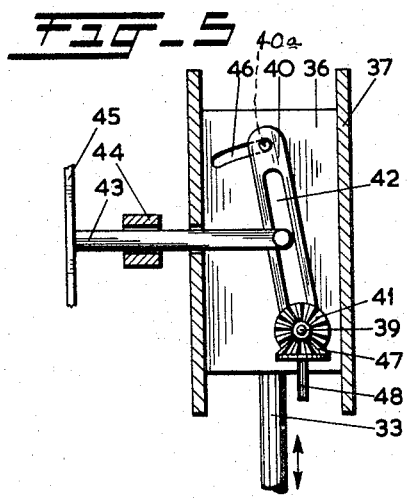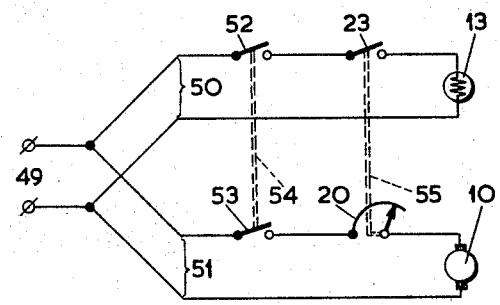

United States Patent Office 3,333,088
Patented July 25, 1967

3,333,088
APPARATUS FOR THE THERMAL DEVELOPMENT OF LIGHT-SENSITIVE MATERIAL
Wilhelm Verbeek, Venlo, Netherlands, assignor to Chemische Fabriek L. van der Grinten N.V., Limburg, Netherlands
Filed July 14, 1964, Ser. No. 382,597
Claims priority, application Germany, July 18, 1963, C 30,470
10 Claims. (Cl. 219—471)

The invention relates to an apparatus for the thermal development of imagewise exposed light-sensitive material, comprising a heat-transmitting device, conveying means for continuously moving the material along the heat-transmitting device, a device for varying the operating speed, and a device for varying the temperature of the heat-transmitting device.

Known apparatuses of this kind are often combined with continuously operating exposure devices, in which the mechanism by means of which the exposure device is driven is simultaneously used for driving the developing apparatus, while the two devices have the same operating speed. In order that the materials fed through the device may always be exposed in the same way, the operating speed must be adapted to the nature of these materials, i.e. to the transparency of the original to be copied and/or to the light-sensitivity of the copying material. It will therefore be necessary from case to case to adjust the operating speed to a different value.

It is an object of the invention to improve apparatuses of this kind, so that even with considerably varying operating conditions, particularly the operating speed, a correct development is always obtained by simple means.

According to the invention, in the apparatus the device for varying the operating speed and the device for varying the temperature of the heat-transmitting device are coupled with each other in such a way that upon an adjustment of the device for varying the operating speed, in order to increase or decrease the operating speed, the device for varying the temperature of the heat-transmitting device is adjusted in such a way that the temperature of the heat-transmitting device is raised or lowered respectively.

In known apparatuses for the thermal development of light-sensitive material, the device for adjustment of the temperature often consists of a thermostat which is mounted in the vicinity of the wall of the heat-transmitting device and which is provided with a control knob whose position indicates at what value the temperature of the heat-transmitting device is kept constant.

Such a device can be improved within the scope of this invention in a simple manner by providing the spindle of the thermostat and the spindle of the control knob of the control knob, by means of which the operating speed is varied, with suitable pulleys or sprocket wheels, and effecting the desired coupling by means of a belt or a chain passing round these wheels. The spindles can also be provided with gear wheels which are coupled with each other by means of a rack.

The use of a thermostat, however, has the disadvantage that the thermostat always registers the variations of the temperature of the heat-transmitting device with some time lag. The relatively great fluctuations in the developing temperature which result from this time lag may cause difficulties when materials having high heat-sensitivity are to be developed.

Such difficulties are avoided in an apparatus making use of a metallic heat-transmitting device which is heated by means of an electric radiator, when the apparatus is provided with a device for observing the temperature of the wall of the heat-transmitting device, so that the length of this wall can be compared with the length of a rod extending parallel to said wall and having an extremely low linear coefficient of expansion, the difference in length causing a switch to be operated which switches off the radiator when the temperature of the wall of the heat-transmitting device is too high and switches it on when the temperature has sufficiently fallen again.

The switch is mounted on an adjustable support, which is coupled with the device for varying the operating speed in such a way that upon an increase of the operating speed the switch is so adjusted that it is operated in case of a greater difference between the length of the wall of the heat-transmitting device and the length of the rod.

The coupling for the adjustment of the switch upon adjustment of the speed control knob can be realized in several ways. In a preferred embodiment of an apparatus according to the invention the coupling is achieved by the switch being attached to a rod which at one end is pivotally connected with the rod having a small coefficient of expansion and at the other end is provided with a sliding pin or bolt that is adapted to move in a slot which is connected with a control member which is moved rectilinearly upon a variation of the operating speed, while the axis of the slot forms an angle with the direction of movement of the control member. With such a construction it is ensured that upon a variation of the operating speed the rod carrying the switch is turned about its pivot, in consequence of which the switch is drawn nearer to or removed further from the heat-transmitting device.

To adapt the apparatus to the handling of different kinds of light-sensitive material, the slot is made in a member which is adjustably connected with the control member. By the adjustment of the slot member the relation between the operating speed and the heat-transmission can then be varied, and thus be adapted to the kind of light-sensitive material to be handled.

The invention will now be described more fully with reference to the accompanying figures, in which FIGURE 1 is a diagrammatic cross-section of a thermal developing apparatus, which comprises a coupling between the mechanism for the adjustment of the operating speed and the mechanism for the adjustment of the temperature;

FIGURE 2 is a diagrammatical longitudinal section along the line II–II' in FIGURE 1;

FIGURE 3 is a diagrammatic side elevation of the same apparatus, seen from the right side of FIGURE 2;

FIGURE 4 is a diagrammatic view of those parts of a thermal developing apparatus which are of importance for the invention, in another embodiment; and FIGURE 5 is a diagrammatic view on an enlarged scale of a modified embodiment of the control member of the device according to FIGURE 4.

FIGURE 6 is a diagrammatic view of the principal parts of an electric system of an apparatus according to any of the other figures.

The apparatus according to FIGURES 1, 2, and 3 comprises a frame having a base-plate 1 and vertical side-walls 2 and 3. The rollers 4, 5, 6, and 7 are rotatably supported by the side-walls 2 and 3. The roller 5 is provided with a trunnion 5a protruding through the wall 2 and carrying at the other side of said wall a gear wheel 8 which engages with a pinion 9 on the shaft of an electric motor 10.

A heat-resistant endless belt 11 is guided round the rollers 4, 5, 6 and 7 and also passes round a cylinder 12 which serves as a heat-transmitting device. The tension in the belt 11 is so high that the cylinder 12 is forced against the rollers 4 and 7. When the driving mechanism is started, the roller 5 drives the belt 11, which in tur drives the rollers 4, 6, and 7 and the cylinder 12 (see the arrows in FIGURE 1).

Mounted inside the cylinder 12, which at its ends is closed by means of plates 12a and 12b, is an electric heating element 13.

At one end the cylinder 12 is axially fixed with respect to the wall 2 by means of rollers 14, which are rotatably supported on supports 15, which are attached to the wall 2. Also attached to the wall 2, parallel to the axis of cylinder 10, are two rods 16 and 17, which are made of a material having an extremely small coefficient of expansion, such as Invar. The rod 16 is rigidly fastened to the wall 2 and can freely move through an opening in the wall 3. The rod 17 is supported in the wall 2 by a flanged bearing 17a, so as to be rotatable but not axially movable with respect to wall 2. The rod 17 passes through an opening in the wall 3 in a manner so as to be freely movable. The left end of the rod 17 (see FIGURE 2) is provided with a gear wheel 18, which cooperates with a gear wheel 19, which is fixed on the shaft of the speed regulator 20, which shaft also has a control knob 21. The speed regulator could be embodied as a speed control transformer or as a variable resistor known per se.

The free end of the rod 16 is bent to form an arm (FIG. 3) which functions as a pivoting pin on which a rod 22 is rotatably supported. The rod 22 carries a micro-switch 23 and is drawn towards the frame wall 3 by a spring 24. The switch arm 23a of switch 23 rests against the end of a stud 25 passing through the wall 3, which stud forms part of the adjacent end plate 12b of cylinder 12. A spring 26 mounted around the stud 25 continuously forces the cylinder against the rollers 14.

At the end passing through the wall 3 the rod 17 has an inclined circular guide surface 27, against which the rod 22 rests at its lower end.

The material to be developed is fed into the apparatus via a guide plate 28, forced against the wall of the cylinder 12 by the belt 11, and in this manner is conveyed through the apparatus and is developed by heat-transmission through the cylinder wall. Via the guide plate 29 the developed material is then ejected.

Via the switch 23 the heating element 13 of the cylinder 12 is energized.

As the temperature rises the cylinder 10 expands. If it becomes too hot the stud 25 operates the switch 23, so that the supply of electric current to the heating element 13 is interrupted. The cylinder 12 will then cool down. When its wall has cooled down sufficiently, the supply of electric current is switched on again.

When the operating speed of the apparatus has to be reduced for instance, the temperature at which the switch 23 is operated must be lowered, because at the lower operating speed the duration of contact between the material to be developed and the wall of the cylinder becomes longer, so that less heat has to be transmitted per unit of time in order to bring the material to the temperature that is most favourable for development. This is attained in that a rotation of the knob 21 by hand for the adjustment of the driving speed is transferred to the gear wheel 18 by gear wheel 19, and with gear wheel 18 also the rod 17 is rotated. Thus the guide-surface 27 is simultaneously rotated, in such a way that the lower end of the rod 22 moves to the left or the right (see FIGURE 2) and thus also the switch 23 is adjusted slightly, in case of a reduction of the operating speed to the left and with an increase of this speed to the right. The point at which the switch 23 is operated by the stud 25 is also moved to the left or to the right so that the switch will now switch on or off the heating element 13 at a lower temperature or at a higher temperature respectively of the cylinder wall.

In FIGURE 4 a similar device is illustrated, in which, however, each of the two rods 16 and 17 is rigidly fastened at one of its ends to the frame wall 2, while the other ends of the rods are connected with each other by means of a strip 30. The strip 30 carries a pivot 31, on which a plate 32 is rotatably supported. The switch 23 is attached to the plate 32. Upon a change in the operating speed of the apparatus, a rod 33, which forms part of the speed-regulating mechanism, is moved rectilinearly.

A sliding pin 34, which is fastened to the rod 33, then moves in a slot 35 in the plate 32. As the slot extends obliquely with respect to the direction of movement of the rod 33, the plate 32 is turned somewhat, as a result of which the switch 23 is moved towards or away from the stud 25, so that the temperature at which the switch is operated is lowered or raised.

In the embodiment illustrated the slot 35 is straight. By giving the slot the correct shape, which could also be curved, the relation between the operating speed and the developing temperature could be linear, logarithmic or otherwise, depending on what is desired.

In the apparatus according to FIGURE 5 the speed-regulating mechanism is also, as in FIGURE 4, provided with a rod 33 which is moved rectilinearly upon a variation in the operating speed.

Attached to this rod is a control member consisting of a plate 36 which is movably supported between guides 37 and 38. Attached to the plate 36 is a shaft 39, on which a strip 40 with a bevel pinion 41 is rotatably supported. The strip 40 is provided with a slot 42, in which the bent end of a rod 43 is movably supported. The rod 43, which is also supported in the guide 38 and in a block 44, at one end carried a plate 45, on which is mounted the switch for switching the heating element on and off such as the switch 23 of FIGURE 4. The strip 40 is provided with a pin 40a, which is adapted to slide in a slot 46 in the plate 36. The bevel pinion 41 cooperates with a bevel gear wheel 47, which is mounted on a shaft 48.

When the operating speed of the apparatus which is provided with this control member is changed, the rod 33, the plate 36, and the parts attached thereto are adjusted rectilinearly.

The strip 40 and the slot 42 are thus moved with respect to the rod 43, and, in consequence, the rod 43 moves in its bearings. The plate 45 and the switch mounted thereon are moved nearer to or further away from the switch operating member such as the cylinder stud 25 as shown in FIGURE 4, so that the apparatus is adjusted to a different developing temperature.

The angle which the axis of the slot 42 forms with the direction of movement of the rod 43 and the plate 36 determines the relation between the operating speed and the developing temperature. By rotation of the shaft 48 the strip 40 can be adjusted, so that the said angle is enlarged or reduced.

In this manner the relation between the developing temperature and the operating speed can be adapted to the nature of the material to be developed.

In FIGURE 6 the electrical system for apparatus according to the preceding figures is shown. At 49 electric energy is supplied to the apparatus from a suitable source. Electric conductors divide this energy and feed part thereof through conductors 50 to the system for feeding and controlling the electric heating element 13 present in the rotating cylinder 12 and feed another part thereof through conductors 51 to the system for feeding and controlling the electric motor 10 driving the belt 11 to make the cylinder 12 rotate.

In one of the conductors 50 there is provided a main switch 52 allowing manual interruption of the feed of electric energy to the heating element 13, and in series connection therewith there is provided the switch 23 of FIGURES 2, 3 and 4.

In one of the conductors 51 there is provided a main switch 53 allowing manual interruption of the feed of electric energy to the electric motor 10. If desired the switches 52 and 53 could be connected mechanically as shown by dotted lines 54 to allow to operate them simultaneously by one manipulation. In series connection with switch 53 there is provided the speed regulator 20 of FIGURE 2, embodied as a variable resistor. The motor 10 is connected in series with switch 53 and resistor 20. There is a connection 55 between switch 23 and resistor 20, shown in dotted lines in FIGURE 6. In the embodiment of FIGURES 1, 2 and 3 this connection 55 is through gear wheels 18 and 19, rod 17, guide surface 27 and rod 22. In FIGURES 4 and 5 the connection could be through gear wheels such as 18 and 19 and a rod 17 as shown in FIGURE 2, but without the guide surface 27 and the rod 22, the rod 17 upon rotation moving a rod 33 linearly, e.g. through a gear wheel on the right and of rod 17 and a toothed rack part on rod 33 engaging said gear wheel.

As stated in the preamble of this specification there could be a thermostat for controlling the temperature to which the heating element 13 is heated, and this could be embodied as a variable resistor such as the resistor 20 for the control of the motor speed, in which case the coupling of both resistors (connection 55) could be by sprocket wheels on their spindles and a chain over these wheels, or by intermeshing gear whels.

In the devices illustrated the heat-transmitting device is a rotating cylinder. It may also be a stationary cylinder or some other member with a heated surface. It is also possible to use as a heat-transmitting device two heated plates mounted some distance apart, between which the material to be developed is passed.

What I claim is:

1. An apparatus for the thermal development of exposed light-sensitive material, comprising, in combination with means for conveying said material through a thermal development zone, means including an electrical heating element for delivering heat to said material in said zone to develop said material, a first variably settable means for regulating the speed of travel of the material through said zone and a second variably settable means for regulating the action of said heat delivering means so as to control the temperature to which the material is subjected in said zone, control means correlating the setting of said second regulating means to the setting of said speed regulating means and operating upon a variation of said speed to effect a compensating variation of action of said temperature heat delivering means so that said material will be heated suitably for development irrespective of the duration of its travel through said zone.

2. An apparatus according to claim 1, said control means comprising mechanisms interconnecting said speed regulating means and said second regulating means and displaced by a variation of the setting of the former to effect a compensating variation of the setting of the latter.

3. An apparatus for the thermal development of exposed light-sensitive material, comprising, in combination with means for conveying said material through a thermal development zone, means including an electrical heating element for delivering heat to said material in said zone to develop said material, variably settable means for regulating the speed of travel of the material through said zone and variably settable means for regulating the temperature to which the material is subjected in said zone, a thermally expansible member for sensing said temperature, said temperature regulating means comprising switch means having a movable element positioned by said thermally expansible member according to the magnitude of said temperature for controlling the operation of said heat delivering means, and means displaced upon a variation of the setting of said speed regulating means for adjusting compensatingly the position of said switch means relative to said thermally expansible member so that upon such a variation to either decrease or increase said speed said heat delivering means will be caused compensatingly to raise or lower, respectively, said temperature.

4. An apparatus according to claim 3, said thermally expansible member comprising a thermally expansible wall through which heat from said source is transmitted to said material in said zone.

5. An apparatus according to claim 4, said switch means being supported in working position relative to said wall through rod means not substantially changed in dimension by changes of temperature.

6. An apparatus according to claim 3, said conveying means including a rotatable cylinder defining said development zone at its outer surface and upon and about which said material is carried through said zone, said heating element being disposed inside said cylinder and controlled by said switch means, the circumferential wall of said cylinder being made of heat-transmitting material that expands substantially with increases of temperature, said wall constituting said thermally expansible member.

7. An apparatus according to claim 6, said cylinder having an end wall displaceable axially by expansion and contraction of said circumferential wall, said end wall carrying an actuator coacting with said movable element of said switch means to de-energize said heating element when the length of said circumferential wall exceeds a predetermined value.

8. An apparatus according to claim 7, said switch means being mounted on a displaceable support that remains substantially unchanged in position under temperature changes, said speed regulating means comprising a control member adjustable in position to vary said speed, said position adjusting means comprising a setting member moved with said control member and co-operating cam surfaces respectively on said setting member and said support for adjusting the position of said switch means relative to said actuator.

9. An apparatus according to claim 8, said cam surfaces being formed by a slot inclined relative to the direction of adjustment of said setting member and a pin fitting slidably in said slot.

10. An apparatus according to claim 8, and means adjustable independently of said position adjusting means for setting said switch means in a position to give the desired developing temperature.

References Cited
UNITED STATES PATENTS

| | | | |
|---|---|---|---|
| 1,594,158 | 7/1926 | Else | 219—512 X |
| 3,027,285 | 3/1962 | Eisner et al. | 219—470 X |
| 3,176,113 | 3/1965 | Eckerfeld | 219—331 |
| 3,242,316 | 3/1966 | Cranskens | 219—471 |
| 3,243,579 | 3/1966 | Sussin | 219—469 |

RICHARD M. WOOD, *Primary Examiner.*

V. Y. MAYEWSKY, *Assistant Examiner.*